United States Patent Office 3,124,430
Patented Mar. 10, 1964

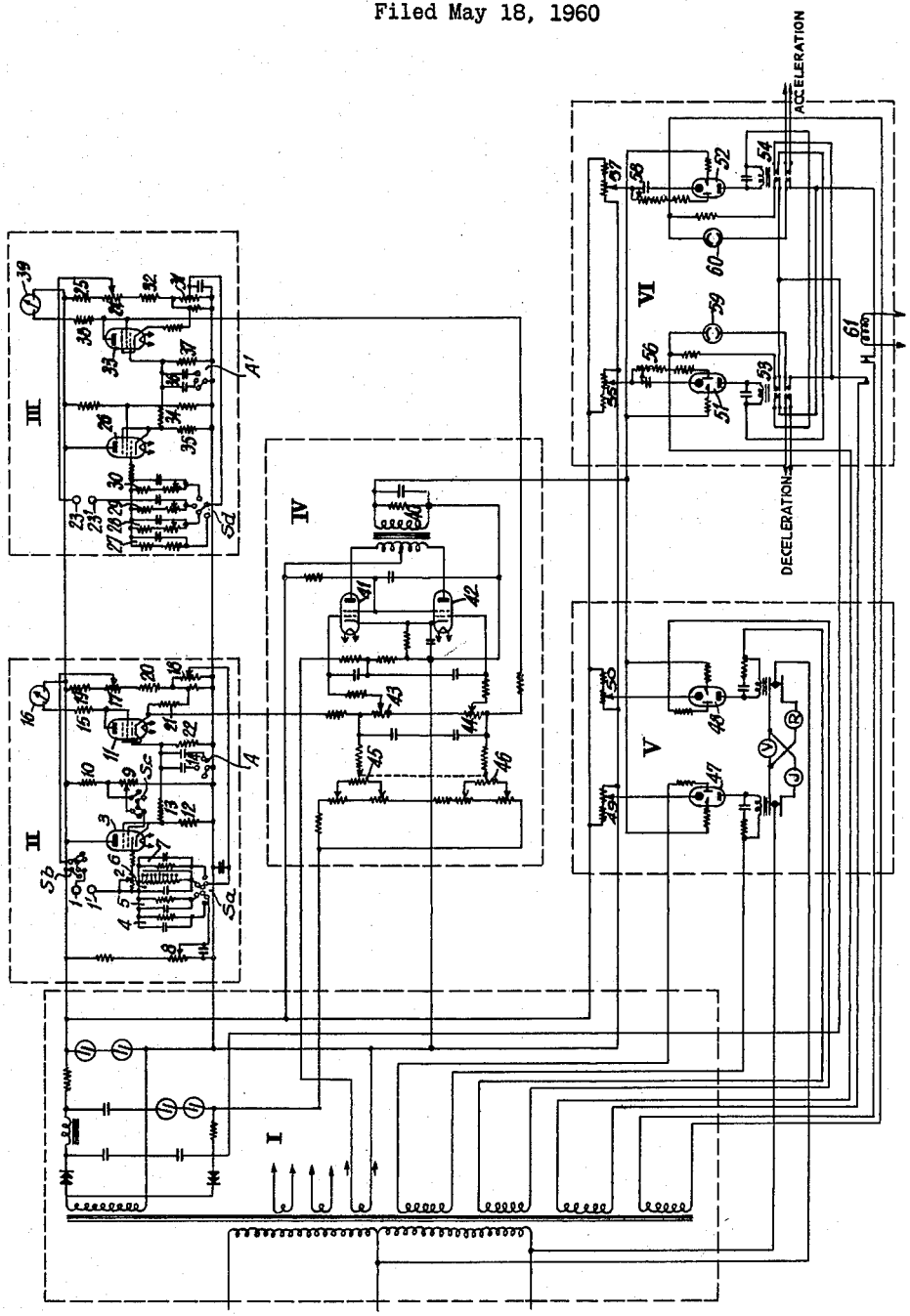

3,124,430
APPARATUS PERMITTING THE DETERMINATION OF THE PERCENTAGE OF MOISTURE CONTAINED IN NON-CONDUCTING OR SEMI-CONDUCTING MATERIALS AND THE AUTOMATIC CONTROL OF MACHINES TREATING SUCH MATERIALS
Henri Eicken, 5 Chemin Malombre, Geneva, Switzerland
Filed May 18, 1960, Ser. No. 29,861
7 Claims. (Cl. 34—56)

The present invention relates to an apparatus for determining and controlling the percentage of moisture contained in a semi-conducting or insulating material and for controlling a machine in which the said material is treated. The said apparatus comprises a first measuring circuit adapted to provide a measuring current which is a function of the percentage of moisture in the material at the outlet of the machine, a second measuring circuit adapted to provide a measuring current which is a function of the moisture content of the material in the machine, the two said circuits being adapted to emit signals representing the relative moistures, and a modulating-integrating device for the said signals adapted to provide control signals proportional to the difference between a previously chosen moisture content and the actual moisture content.

The single figure of the accompanying drawing is the diagram of an embodiment of the said apparatus.

The said embodiment comprises six groups of circuits I to VI.

Group I represents a suitable voltage feeding device for the whole of the apparatus. It illustrates a known wiring system which is not described in detail. It should be noted, however, that the windings $a$, $b$, $c$ and $d$, for providing voltages to tubes 47, 48, 51 and 52 referred to later, are arranged so that the windings $a$ and $c$ furnish voltages the phase of which is in opposition to that of the voltages furnished by windings $b$ and $d$.

Group II constitutes a first measuring circuit, designed to measure the moisture content of a material passing through a machine, the measurement being taken at the outlet of the machine. The said group II comprises two electrodes 1 and 1', positioned at the outlet of the machine. The electrode 1 is connected through a four-position rotary switch S$b$ to the positive terminal of the high voltage source. The electrode 1' is connected on the one hand, through a potentiometer 2 and a fixed resistance, to the grid of a tube 3, and on the other hand, through four units 4, 5, 6 and 7 each comprising at least one constant value resistance in parallel with a condenser, and through a four position switch S$a$ and a potentiometer 18, to the negative terminal of the high voltage source. The unit 6 comprises a set of resistances each of which may be separately connected up. The said unit 6 is capable of providing a very high precision of measurement.

The second grid of tube 3 is connected to a four position switch Sc, a potentiometer 9 connected to the negative terminal of the high voltage source and a resistance 10 connected to the positive terminal.

The cathode and the third grid of the tube 3 are connected one to the other and, through a fixed resistance 13, to the control grid of a tube 11, and through fixed resistances 12, 13, 22 to a group of condensers 14 and a switch A, to the negative terminal of the high voltage source. The anode of tube 3 is connected directly to the positive terminal of the high voltage source and the anode of tube 11 is connected to the said positive terminal through a fixed resistance 15 and a galvanometer 16. The cathode and the third grid of the tube 11 are connected together and connected on the one hand to a group IV and on the other hand, through a set of resistances and potentiometers 17, 18, 19, 20, 21 and 22, either to the positive terminal of the high voltage source or to the negative terminal.

The three switches S$a$, S$b$ and S$c$ of group II and the switch S$d$ of group III are mounted on a common shaft.

Group III constitutes a second measurement circuit designed to determine the moisture content of the material inside the machine. It comprises two electrodes 23 and 23'. The electrode 23 is connected through a potentiometer 24 and a resistance 25 to the positive terminal of the high voltage source, and through the potentiometers 24 and 31 and a resistance 32 to the negative terminal of the high voltage source. The electrode 23' is connected on the one hand to the grid of a tube 26 and on the other hand, through four units 27, 28, 29 and 30 each comprising a resistance and a condenser in parallel, a rotary switch S$d$ and a potentiometer-condenser unit 31, to the negative terminal of the high voltage source. The cathode and the third grid of the tube 26 are connected together on the one hand to the grid of a tube 33 and on the other hand, through a set of resistances and condensers 34, 35, 36 and 37 and a switch A', to the negative terminal of the high voltage source. The anode of the tube 33 is connected through a fixed resistance 38 and a galvanometer 39, to the positive terminal of the high voltage source.

Group IV is a modulating-integrating device with a proportional variation of the signals received from the groups II and III, as will be seen further on. It comprises a transformer 40, two tubes 41 and 42 and potentiometers 43, 44, and 45, 46. The potentiometers 45 and 46 are mounted on a common shaft. The said group further comprises a set of resistances and condensers connecting the various parts of the circuit and the operation of which will be described later on.

Group V constitutes a signalling device. It utilizes as relays cold cathode tubes 47, 48 with adjusting potentiometers 49 and 50.

Group VI constitutes an automatic control device. It comprises cold cathode tubes 51 and 52, each cooperating with power relays 53 or 54, regulating potentiometers 55, 56, 57 and 58, pilot lamps 59 and 60 and a contactor 61 controlling the working and the stopping of the group VI.

The apparatus operates in the following manner. Group I feeds groups II to VI with suitable voltages, in a known manner. The electrodes 1 and 1' of group II are positioned, as already noted, at the outlet of the machine to be controlled and have for their function to measure the moisture content of the material to be controlled at the outlet of the machine. The apparatus as a whole is adapted to measure a moisture content varying between 0 and 100%. The units 4, 5 and 7 and the switch S$a$ provide a choice in the different ranges of measurement. For example, the unit 4 is suitable for a moisture content included between 0 and 5% (position 1 of the switch S$a$), the unit 5 for a content included between 3 and 25% (position 2), and the unit 7 for a content included between 20 and 100% (position 4). With the switch in the position 3, the unit 6 is connected for obtaining very great precision in reading. Its operation is explained later on.

The potentiometer 8 has for its function to adjust the zero point for the sensitivity determined by the units 4 and 5 (positions 1 and 2 of the switch S$a$). The potentiometer 2 adjusts the point 100% (maximum) for the same sensitivity. The potentiometer 9 is designed to adjust point 50% for the first and second sensitivities (positions 1 and 2 of S$a$) bringing into play the unit 4 or 5. The potentiometer 18 permits high precision adjustment (position 3 of switch S$a$ and unit 6) and that of the high moisture contents (position 4, unit 7). Unit 14 and the switch A provide a damping effect proportional to the strength of the signals supplied by the tube 3 to the tube 11.

The electrodes 23 and 23' in the group III are positioned inside the machine to be controlled, in contact with the material whose moisture is to be measured.

The resistances and condensers 27, 28, 29 and 30 as a whole are connected to the switch Sd which is mounted, as already noted, on the same shaft as the switches Sa, Sb and Sc and the position of which therefore corresponds to the sensitivity determined by the switch Sa controlling the units 4, 5, 6 and 7 of group II, taking into account the difference of the moisture content inside and at the outlet of the machine. The potentiometer 24 of group III permits the control of the circuit of the said group for a moisture content of 100%, and the potentiometer 31, the adjustment at zero. An adjustment for the value of 50% is useless since the two tubes 26, 33 as a whole operate without grid current, the potential being fixed slightly above in view of the possible grid current. The condensers 36 and the switch A' provide, as in group II, a possible damping of the signals received.

Group IV operates as a modulator-integrator of the signals received and transmits the resultant of the said signals to group V for visual signalling and to group VI for actuating the automatic control. The potentiometers 45, 45a and 45b and the potentiometers 46, 46a and 46b are mounted on the same shaft and permit of previously fixing, respectively, the moisture content desired outside the machine and the corresponding moisture content inside the machine. It is thus possible to determine the moisture content which it is desired to obtain at the outlet of the machine. The potentiometer 45 controls the circuit of group II and the potentiometer 46 that of group III. Practically, the mechanical position of the electrodes 23 and 23' is determined by the internal construction of the machine and may not be optimum. The potentiometer 43 enables tuning the signals proceeding from group II and the potentiometer 45 enables proportioning the signal relationship between the measurement at the outlet of, and inside, the machine. In other words, the possibility exists of mounting the inner electrodes at the most convenient place in the machine, without taking into account the relationship between the inner and outer electrical measurements of the machine, and "electrically" moving the position of the inner electrodes in order to obtain the optimum relationship.

The potentiometers 49 and 50 of group V enable obtaining a certain advance or a certain lag of the ignition point of the tubes 47 and 48 which actuate, through the agency of conventional relays, a series of optical signalling systems constituted in the present case by green V, yellow J and red R lamps. Any other device might be used, for example acoustical signals.

The potentiometers 55, 56 and 57, 58 of group VI permit the suitable control of the operation of the tubes 51 and 52 taking into account the various characteristics of the machine to be controlled. The said tubes 51 and 52 control power relays which actuate slowing down or accelerating devices for the machine to be controlled.

Let us suppose, for example, that it is desired to obtain at the outlet of the machine a cotton fabric containing 8% of moisture, with very great reading precision. One first of all chooses the second sensitivity, position 2 of the switch Sa, which provides, in such a case, for reading a moisture content included between 3 and 25%. When the galvanometer 16 indicates 8%, the switch Sa is placed in the position 3, and the switch controlling all the resistances 6 is then turned in order to bring the previously read indication of 8% to the position 50 of the galvanometer. From that moment, the content of 8% is represented at the centre of the scale of the galvanometer, the content 7% is indicated by the division 0 and the content of 9% by the division 100 of the scale. In other words, 50 divisions on the scale of the galvanometer 16 represent a difference of 1% in the moisture contents, thus representing a precision of 0.02%.

Let us consider the operation of the apparatus described by supposing that the machine to be controlled is intended to dry textile materials. The electrodes 1 and 1' are mounted, as already noted, at the outlet of the machine and the electrodes 23 and 23' inside. The fabric passes, inside the machine and at the outlet of the same, between rollers constituting the electrodes 1, 1' and 23, 23' as a whole. Let us assume that the said fabric must present a moisture of 8% at the outlet of the machine. The switch Sa, and consequently simultaneously the switches Sb, Sc and Sd, are placed on the position 2, with a sensitivity permitting the measurement between 3 and 25% of moisture.

The measuring circuit of group II measures the moisture of the fabric and finds, for example, 5% at the outlet of the machine. In such a case, the electrical value corresponding to this moisture content is transmitted with very great stability to the potentiometers 43 and 45 of the group IV, the said stability being due to the fact that, as measuring current, use is made of the cathodic current of the tube without grid current. The potentiometers 45 and 46 have been previously adjusted to a position corresponding to a moisture content of 8%. The signal which reaches the group II is weaker than the value determined by the said potentiometers, the grids of the tubes 41 and 42 are polarized at about zero. The tube 41 produces a signal which is transmitted through the transformer 40 to the tubes 47, 48, 51 and 52, the said tubes being previously suitably adjusted from the point of view of advance or lag of the ignition. The said signal brings about the ignition of the tube 47, which results in the lighting of the yellow light J (too dry) of group V, and tube 51 of group VI actuates the relay 53 to actuate the device of the machine for increasing the speed of the latter. The machine continues to accelerate and as a result the fabric becomes more and more moist in order to approach the chosen content of 8%.

Moreover, the circuits of groups II and III are tuned by means of the switches Sa, Sb, Sc and Sd. The measuring circuit of group III indicates inside the machine, at the point chosen for the location of the inner electrodes, for example a moisture of 20% when the outer electrodes indicate 5%. When the machine accelerates, the outer indications rise gradually from 5 to 8% and the inner indications pass through corresponding values, for example from 20 to 30%. These values are obviously arbitrarily chosen for explanatory purposes.

As a result, when the speed of the machine increases, the cathodic currents arriving from the tubes 11 (group II) and 33 (group III) increase progressively, but still remain below the value determined by the potentiometer 43 at the grid of the tube 41. The tube 41 therefore continues to emit through the transformer 40 a continuous signal towards the tube 51 (group VI) the ignition point of which has been previously adjusted to the same value as the potential of the grid of tube 41.

When between the electrodes 1 and 1' (outer measurement), the value of the measurement current corresponding to a moisture content of 8% approaches the said value, the tube 11 continues to emit a current which approaches more and more the value determined by the potentiometers 45 and 43 at the grid of the tube 41, and consequently the control signal becomes progressively weaker. At that moment, the moisture content inside the machine having already become too high, the intensity of the measuring current arriving from the tube 33 (group III) exceeds the value determined by the potentiometers 46, 44 at the grid of the tube 42. The tube 42 thus emits an anodic current greater than that arriving from the tube 41 and, as the phase of the voltage applied to the tube 52 is in opposition to that of the voltage applied to tube 51, this causes the switching off of tube 51 and the lighting of tube 52 and brings about actuation of the slowing down device of the machine.

There are thus produced control impulses absolutely proportional to the difference between the chosen moisture contents and those measured outside and inside the machine, and it becomes impossible for the machine to be controlled to exceed the speed corresponding to the desired drying.

The same thing also occurs when the machine has a correct speed for drying at a desired rate for a fabric of a certain weight and when there is added to the said fabric another fabric of different weight and which requires another machine speed. Let us suppose for example that the machine treats a fabric weighing 3.5 oz. per metre, at a moisture content of 8%, at a speed of 330 feet/min. If another fabric of a weight of 7 oz. per metre for example is now joined to the said fabric, as is often the case in practice, what follows would happen in a machine including an apparatus having only one measurement circuit. The new fabric would pass through the machine at the speed adjusted for the light fabric and, reaching the electrodes of the measurement apparatus mounted at the outlet of the machine, it would be much too moist. An exaggerated decrease of the speed of the machine would result and, during a certain time during which an appreciable quantity of the fabric would be badly dried, the machine would hunt before again recovering the speed corresponding to the heavier fabric.

In the apparatus described, on the contrary, so long as the light fabric is still in contact with the electrodes 1 and 1', the measuring current arriving from the tube 11 corresponds to the value determined by the potentiometer 43, all the relays are at rest and the pilot lamp V (correct) remains lighted. But as soon as the new fabric of a heavier weight, and which therefore requires a slower speed of the drying machine, enters into contact with the electrodes 23 and 23', the latter measure a moisture content which is too high, because the heavy fabric joined to the light fabric has penetrated into the machine at the same speed of 330 feet/min., correct for the light fabric, and it has passed through a part of the machine at the said too high speed. The measuring current arriving from the tube 33 (group III) is therefore greater than the value determined by the potentiometer 46 and it brings about through the tubes 48 and 52 a slowing down of the machine. Due to this slowing down the reading made by the electrodes 1 and 1' indicates that the fabric is too dry and brings about through the tube 11, the potentiometers 45, 43, the transformer 40 and the tube 51, an acceleration signal. These two opposed signals are modulated and integrated in the said group IV and control impulses are obtained which go alternately to the tubes 51 and 52. Accordingly, already during the passage of the new fabric in the machine, a new speed is produced corresponding to the content of 8% for the new heavier fabric, the said speed being lower than for the light fabric. Practically, in this way it is possible to eliminate hunting in the running of the machine, without interruption in the said running, for any kind of fabric. Automatically, the correct speed is established according to the moisture content desired and determined by the potentiometers 43, 44.

Upon stopping of the machine, the power relays 53 and 54 of group VI are cut off by means of the contactor 61. Upon starting up again, the measuring circuit of the group II produces a rapid acceleration in the speed of the machine to bring out the overheated part of the treated material, and the latter tends rapidly to become too moist inside. But the signals proceeding from the measuring circuit of group III, which are contrary to the signals proceeding from the measuring circuit of group II, bring about a reaction in the direction of slowing down. The resultant of the said two contrary signals produces, through the transformer 40 and the tubes 51 and 52, control impulses which guarantee correct running and speed of the machine corresponding fully to the chosen moisture percentage.

It is possible to add further measuring circuits connected to temperature indicators IIA, air moisture indicators IIB, indicators IIIA indicating the viscosity of the products used in the process, etc., and to connect these measuring circuits to the group IV so as to obtain a speed of the machine in which not only the moisture of the material itself but all the other factors would be taken into account, which could have some effect on the process.

What I claimed is:

1. Apparatus for determining simultaneously at two separate locations the moisture content of material being treated, in which the material changes, its electrical characteristics between conducting and insulating states, for the automatic control of the treatment of the material, said apparaus comprising at least two electrically seperated and independent measuring means, each of said means being operatively associated with the material being treated to produce characteristic electrical signals representing the respective moisture content of the material at the location being measured, means connected to both said means and operative in dependence upon the said characteristic signals to provide control signals dependent upon the difference between a previously chosen value for the moisture content and the actual moisture measured at the different locations and means responsive to the control signals of the last said means to control the moisture content of the material as the latter is treated such that the moisture content of the treated material corresponds substantially to the first mentioned chosen value of the moisture content.

2. Apparatus as claimed in claim 1 wherein one of the means for measuring the moisture content in the material includes an indicator device which comprises means for reducing the scale of the indicator device such that the measured moisture content is indicated centrally on the device and the end parts of the scale respectively correspond to deviation of plus and minus one percent from the measured moisture whereby a two percent range is spread over the entire indicating scale.

3. Apparatus as claimed in claim 1 wherein said material is treated in a drying machine and one of said measuring means is adapted for measuring the moisture content of the material being treated at a pre-established location within the drying machine, the latter said means including electrodes insulated from ground and located at a convenient position within the machine for contacting the material to measure the moisture content, which latter position may be displaced from the location at which the moisture content is desired, and means for adjusting the moisture content as measured by the electrodes to correspond to the moisture content at the desired pre-established location.

4. Apparatus as claimed in claim 1 wherein each of the two measuring means comprises a first and second electronic tube and means between the cathode of the first tube in each circuit and the grid of the second tube in each circuit for obtaining a smoothing of the signal from the cathodes and therefore a stabilization of the signals emitted by the second tubes.

5. Apparatus as claimed in claim 1 wherein each of said measuring means comprises electronic tubes arranged such that the cathodic currents thereof are employed as measuring currents, the measuring means which is downstream of the direction of travel of the material having an electronic output tube having a grid bias that is substantially zero to produce greater sensitivity and stability of the measurements and of the control signals.

6. Apparatus as claimed in claim 1 comprising relays which are controlled by cold cathode tubes, a first of which operates to bring about an increase in the moisture content of the material and a second of which operates to bring about a decrease in the moisture content, means to adjust the ignition point of each of the cold cathode tubes, and wherein the operating voltage of the first tube is of opposite phase to the operating voltage of the second tube and this operating voltage is obtained from a transformer which forms an output stage of the said means for providing said control signals.

7. A method of treating material to adjust the moisture content thereof comprising passing the material through a treatment zone in which the moisture content of the material is adjusted to a desired level, measuring characteristics of the material at a location within the zone and at a location after the treatment zone, which characteristics are a function of the moisture content of the material, integrating the measured characteristics from both locations, comparing the measured characteristics with reference characteristics corresponding to the desired moisture content and controlling the treatment of the material within the treatment zone until the measured characeristics correspond to the desired characteristics and thereby the moisture content of the material after treatment is at the desired level.

References Cited in the file of this patent

UNITED STATES PATENTS

| | | |
|---|---|---|
| 2,484,594 | Spangenberg | Oct. 11, 1949 |
| 2,613,249 | Babb | Oct. 7, 1952 |
| 2,862,304 | Eicken Dit Estienne | Dec. 2, 1958 |

OTHER REFERENCES

Publication: "Gas Analysis by Measurement of Thermal Conductivity," by Daynes, Cambridge University Press, 1933, pages 74, 75 relied on.